US010773196B2

(12) United States Patent
Lin et al.

(10) Patent No.: US 10,773,196 B2
(45) Date of Patent: Sep. 15, 2020

(54) GLUING METHOD OF A FILTER CARTRIDGE

(71) Applicant: PRO-PURE INC., New Taipei (TW)

(72) Inventors: Hsiang-Chi Lin, New Taipei (TW); Zhen-Kun Zhan, New Taipei (TW)

(73) Assignee: PRO-PURE INC., New Taipei (TW)

( * ) Notice: Subject to any disclaimer, the term of this patent is extended or adjusted under 35 U.S.C. 154(b) by 281 days.

(21) Appl. No.: 15/937,386

(22) Filed: Mar. 27, 2018

(65) Prior Publication Data
US 2019/0224604 A1   Jul. 25, 2019

(30) Foreign Application Priority Data

Jan. 24, 2018   (TW) .............................. 107102493 A

(51) Int. Cl.
*B01D 46/00* (2006.01)
*B01D 46/52* (2006.01)
*B01D 35/30* (2006.01)
*B01D 46/24* (2006.01)

(52) U.S. Cl.
CPC ......... *B01D 46/0005* (2013.01); *B01D 35/30* (2013.01); *B01D 46/0001* (2013.01); *B01D 46/0002* (2013.01); *B01D 46/002* (2013.01); *B01D 46/2411* (2013.01); *B01D 46/521* (2013.01); *B01D 46/527* (2013.01); *B01D 2265/05* (2013.01); *B01D 2265/06* (2013.01); *B01D 2271/027* (2013.01)

(58) Field of Classification Search
CPC ................ B01D 46/00; B01D 46/0005; B01D 46/0001; B01D 46/0002; B01D 46/002; B01D 46/2411; B01D 46/521; B01D 46/527; B01D 35/30; B01D 2265/05; B01D 2265/06; B01D 2271/027

USPC ........................................ 55/490–519; 156/69
See application file for complete search history.

(56) References Cited

U.S. PATENT DOCUMENTS

2006/0288675 A1 * 12/2006 Chan .................... B01D 27/005
                                                                55/498
2017/0333818 A1    11/2017 Way

FOREIGN PATENT DOCUMENTS

| DE | 3440992 A1 | 5/1986 |
| JP | 58-92435 A | 6/1983 |
| JP | 63-9208 U  | 1/1988 |

(Continued)

OTHER PUBLICATIONS

Japanese Application No. 2006-280505, filed Oct. 13, 2006, with an English abstract.

*Primary Examiner* — T. Bennett McKenzie
(74) *Attorney, Agent, or Firm* — Birch, Stewart, Kolasch & Birch, LLP

(57) ABSTRACT

A gluing method of a filter cartridge includes: preparing a filter core and a filter frame; disposing them in a lower mold with the filter frame under the filter core; filling glue on top of the lower mold, extending the glue to a gluing segment of the filter frame and an outer surface of the filter core; pressing down an upper mold toward the lower mold to cut the glue into an inner glue segment and an outer glue segment. The inner glue segment is pressed in between the filter frame and the filter core, coated around the gluing segment to increase adhering area. Pressure from the upper mold enhances the adhering effect. The cutting removes surplus glue and the glue is formed into a desired shape, thus the method is quick, accurate and consistent.

6 Claims, 14 Drawing Sheets

(56) References Cited

FOREIGN PATENT DOCUMENTS

| | | |
|---|---:|---|
| JP | 2001-305081 A | 10/2001 |
| JP | 2002-1029 A | 1/2002 |
| JP | 2002-143622 A | 5/2002 |
| JP | 2009-536574 A | 10/2009 |
| JP | 2011-528987 A | 12/2011 |
| JP | 2016-198755 A | 12/2016 |
| TW | 367016 U | 8/1999 |
| TW | 200400076 A | 1/2004 |
| TW | I330102 B | 9/2010 |
| TW | M540682 U | 5/2017 |

* cited by examiner

GLUING METHOD OF A FILTER CARTRIDGE

CROSS-REFERENCE TO RELATED APPLICATIONS

This application is based upon and claims priority under 35 U.S.C. 119 from Taiwan Patent Application No. 107102493 filed on Jan. 24, 2018, which is hereby specifically incorporated herein by this reference thereto.

BACKGROUND OF THE INVENTION

1. Field of the Invention

The present invention relates to a gluing method of a filter cartridge, which is for filtering suspended particles from fluid.

2. Description of the Prior Arts

A conventional filtering device comprises a housing and a filter cartridge. With reference to FIGS. 12 and 13, the filter cartridge comprises a filter core 91, a filter frame 92, and a rubber layer 93. The filter frame 92 is mounted around an end of the filter core 91. The filter core 91 and the filter frame 92 are securely adhered to each other by glue 94, and the glue 94 also seals a gap between the filter core 91 and the filter frame 92. The rubber layer 93 is coated around the filter frame 92 and is clamped between the filter core 91 and the housing axially or radially so as to seal the gap between the filter frame 92 and the housing.

Because of the sealing of the gap between the filter core 91 and the filter frame 92 and the sealing of the gap between the filter frame 92 and the housing, the fluid entering the housing is only capable of passing through the filter core 91 and leaving from the other end of the housing. By passing through the filter core 91, dust or other suspended particles will attach to the filter core 91, and therefore the filter core 91 is capable of achieving the filtering effect.

However, the two conventional means of sealing the gaps of the filtering device have several defects.

When gluing the filter frame 92 to the filter core 91, the first step is to mount the filter frame 92 around the filter core 91, and then insert a glue gun into a position between an edge of an opening of the filter frame 92 and an outer surface of the filter core 91. Then glue and seal the gap between the filter frame 92 and the filter core 91 by circling the glue gun around the gap, and therefore the filter core 91 and the filter frame 92 may be adhered to each other by the glue between them.

However, the defects of the aforementioned method are as follows.

First, the glue gun needs to be precisely inserted into the gap between the filter frame 92 and the filter core 91 and then circles around the gap. This sophisticated operating process needs to be done manually rather than by machines. Therefore it is not only labor-intensive but also time-consuming.

Second, as mentioned above, the controlling of the glue gun is difficult and sophisticated, and therefore the glue may by coated inconsistently around the gap or even overflowing from the gap, which is detrimental for the appearance.

Third, because of the complications in the gluing process, the qualities of the sealing and adhering of the glue 94 are both low because of the aforementioned operating process. Meanwhile, the glue 94 may stick to an upper part of the gap rather than flowing into a lower part of the gap because of factors such as pressure insufficiency, which further reduces the adhering effect.

Fourth, the glue 94 is only attached to the edge of the opening of the filter frame 92 and the outer surface of the filter core 91, which means the adhering area for the glue is limited, thereby resulting in a poor adhering effect.

As for coating the rubber layer 93 around the filter frame 92 in the conventional filtering device, specifically, the rubber layer 93 is a thermo-plastic rubber (TPR), and the rubber layer 93 is coated around the filter frame 92 by injection, but this method also has several defects.

First, the rubber layer 93 is not reusable, which is wasteful and is not environmentally friendly.

Second, because the TPR has a high hardness level, it takes more strength for the user to properly press and install the rubber layer 93 into the housing, and the installation is inconvenient.

Third, also because of the hardness of the TPR, the compression range of the rubber layer 93 cannot be too large (which means the thickness of the rubber layer 93 must be constrained), otherwise it may further increase the installation difficulty. However, if the compression range of the rubber layer is too small, the acceptable range for the tolerance will be reduced, which means it is more difficult to seal the filter cartridge properly and might result in fluid leakage. Especially when the housing is made of plastic, the larger the volume of the housing, the greater the tolerance, and the possibility of leaking therefore increases correspondingly.

Fourth, with reference to FIG. 14, if the filter core 91 and the filter frame 92 are both obround, in the filter core 91, the two plane surfaces of the two long sides may be easily and inwardly pressed by the two arc-shaped surfaces of the two short sides because of insufficient stress on the two long sides. In the end, the filter core 91 and the filter frame 92 will deform into a peanut-shape. At this time, if the compression range of the rubber layer 93 is too small, the rubber layer 93 on the peanut-shaped filter core 91 and the filter frame 92 may not be capable of tightly attaching to the inner surface of the housing. Therefore the rubber layer 93 cannot be thoroughly and effectively attached to the inner surface of the housing and therefore causes the leak. Besides, the reactionary force produced by the high hardness level of the TPR may even deteriorate the peanut-shaped deformation of the filter core 91 and the filter frame 92.

To overcome the shortcomings, the present invention provides a filter frame, a filter cartridge and a gluing method of the filter cartridge to mitigate or obviate the aforementioned problems.

SUMMARY OF THE INVENTION

The main objective of the present invention is to provide a gluing method of a filter cartridge that is capable of being coated quickly and consistently, and meanwhile maintains better sealing and adhering effects.

The gluing method of a filter cartridge comprises steps as follows:

(a) Preparing a filter core and a filter frame. The filter frame comprises an axial direction, a radial direction, a frame body, an abutting segment, and a gluing segment. The radial direction is perpendicular to the axial direction. The frame body is annular and has two axial end openings being opposite to each other. The abutting segment axially protrudes from and annularly extends along an edge of one of the two axial end openings. The abutting segment has a filter core abutting surface formed on a surface of the abutting segment and said surface is distal from the frame body. The gluing segment axially protrudes from and annularly extends around the filter core abutting surface of the abutting segment. The gluing segment has an inner gluing surface and an outer gluing surface respectively formed on a radial inner side and a radial outer side of the gluing segment.

(b) Disposing the filter frame and the filter core in a lower mold. The filter frame is disposed below the filter core. One axial end of the filter core is mounted through the gluing segment and attaches to the filter core abutting surface of the filter frame.

(c) Coating glue. The glue is coated on the gluing segment of the filter frame and the filter core, and the glue is attached to an upper end of the gluing segment, the outer gluing surface, and an outer surface of the filter core.

(d) Cutting off the surplus glue by an upper mold. The upper mold is pressed downward and toward the lower mold and the filter frame to cut the glue into an inner glue segment and an outer glue segment. The inner glue segment is attached to the filter frame and the filter core to adhere the filter frame securely to the filter core. The upper mold also presses the inner glue segment into a position between the upper gluing segment and the filter core to attach the inner glue segment to the inner gluing surface of the gluing segment and to coat the inner glue segment around the gluing segment. Lastly, the filter frame, the filter core, and the inner glue segment are taken out from the upper mold and the lower mold.

Because the filter frame has a gluing segment surrounding an end of the filter core, the user may tightly attach the filter frame to an outer side of the filter core by coating glue on the upper end of the gluing segment, the radial outer side of the gluing segment, and the outer surface of the filter core. Then cut the surplus glue by pressing the upper mold downward and simultaneously squeezing the glue into a position between the gluing segment and the filter core, which also simultaneously coats the glue around the gluing segment. Therefore, the filter frame is adhered to the outer side of the filter core.

Because the glue is coated on the gluing segment and also covers and is attached to at least the upper end of the gluing segment, the inner gluing surface and the outer gluing surface, the adhering area between the glue and the filter frame is effectively increased. Meanwhile, the glue is coated on the gluing segment and the filter core beforehand in an amount that is more than needed, and therefore when the upper mold downward presses the filter core and the filter frame, it will upward press the glue on the inner side of the upper mold, thereby increasing the adhering area between the glue and the outer surface of the filter core, which means the overall adhering area between the glue and the filter core is also increased. By increasing the adhering area between the glue and the filter frame and the filter core, the sealing and adhering effects may be effectively enhanced. Beside, the pressure that occurs when the upper mold presses downward also presses the glue into the gap between the filter core and the gluing segment so as to increase the adhering area. The pressure also makes the glue tightly adhered to the gluing segment and the filter core and further increases the gluing effect.

Moreover, because the glue is coated around the gluing segment, which means the height of the glue is higher than the height of the gluing segment, the height of the gluing segment in the present invention can be lowered to reduce the overall volume of the filter frame. On the contrary, the conventional filter cartridge has it glue coated by the glue gun, therefore the upper end of the glue can only be as high as the edge of the opening of the filter frame, otherwise the glue might overflow from the filter frame, and therefore the edge of the opening of the conventional filter frame needs to be designed at least higher than that of the present invention.

Lastly, the glue in the present invention does not have to be coated deeply into the gap between the filter core and the gluing segment carefully beforehand, but only needs to be roughly coated around. Then the user may cut off the surplus glue (the outer glue segment) and the required glue (the inner glue segment) by downward pressing the upper mold. Therefore, compared to the glue gun, the gluing method in the present invention is quicker, more accurate, and more consistent. By doing so, it may prevent the glue from overflowing. Therefore the present invention has a quick and reliable sealing and adhering method.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
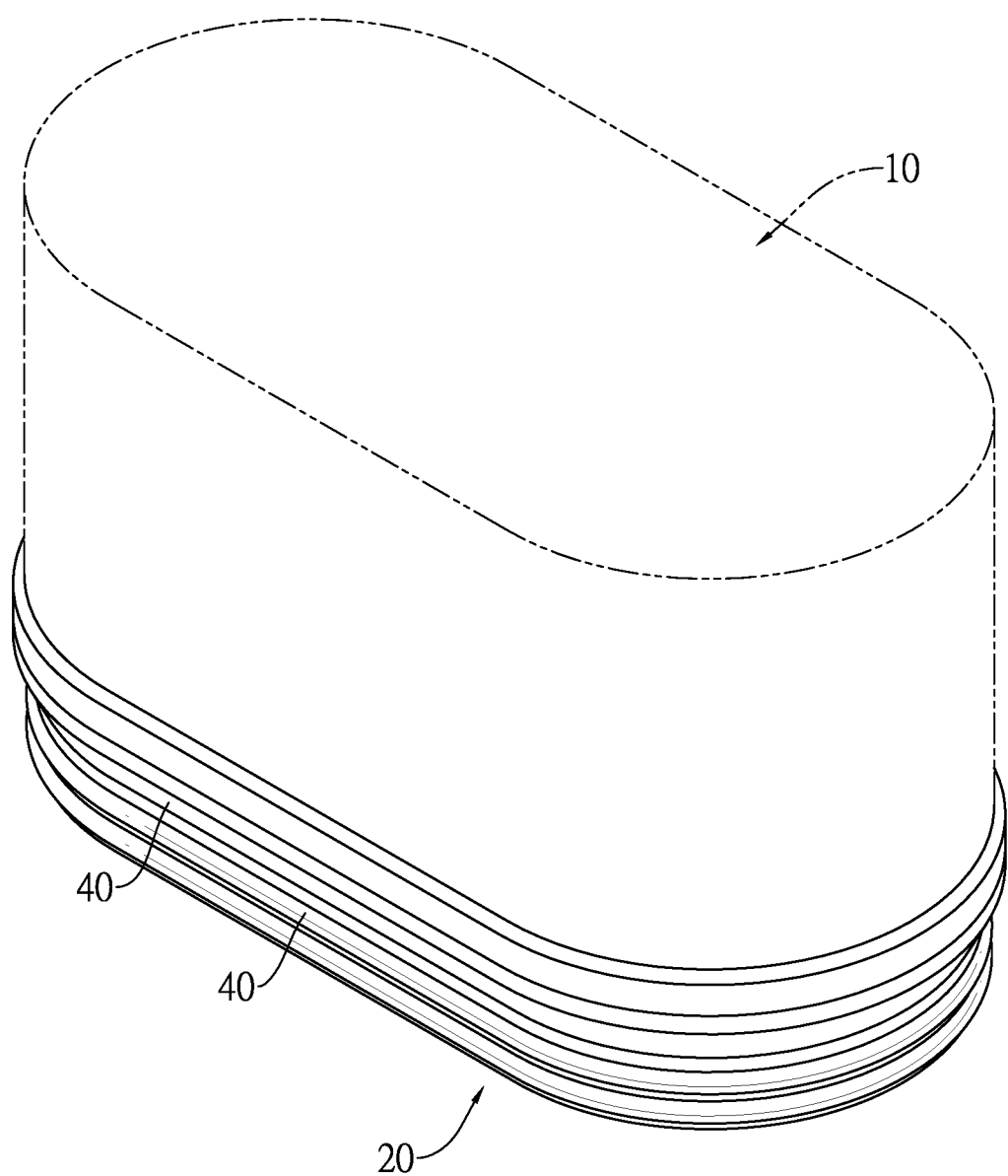
FIG. 1 is a perspective view of a filter cartridge in accordance with the present invention.
Figure 2:
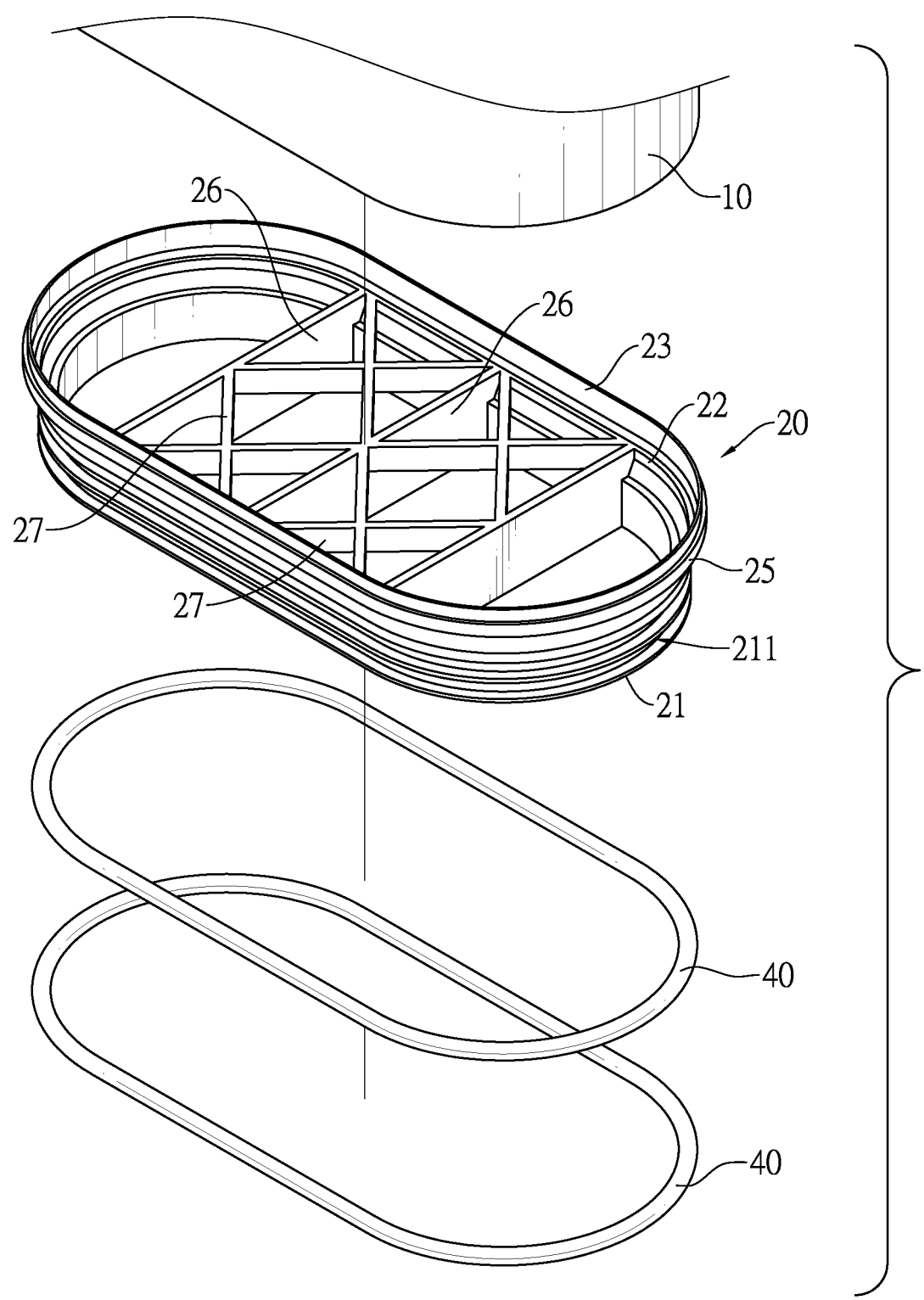
FIG. 2 is an exploded perspective view of the filter cartridge in FIG. 1.

With reference to FIGS. 1 and 2, a filter cartridge in accordance with the present invention comprises a filter core 10, a filter frame 20, glue 30 and two sealing units 40.

The filter core 10 has an axial direction and a radial direction, and the radial direction is perpendicular to the axial direction.

The aforementioned filter core 10 is not limited to any category or shape. For example, the shape may be circular, obround, etc, as long as the filter core 10 allows fluids to pass through and be filtered. In a preferred embodiment, the filter core 10 is, but not limited to, in a honeycomb shape and has several axial channels. The filter core 10 may also be folded in configuration. As the shape of the filter core 10 is not limited, the filter core 10 shown in the figures is only schematic.

Figure 7:
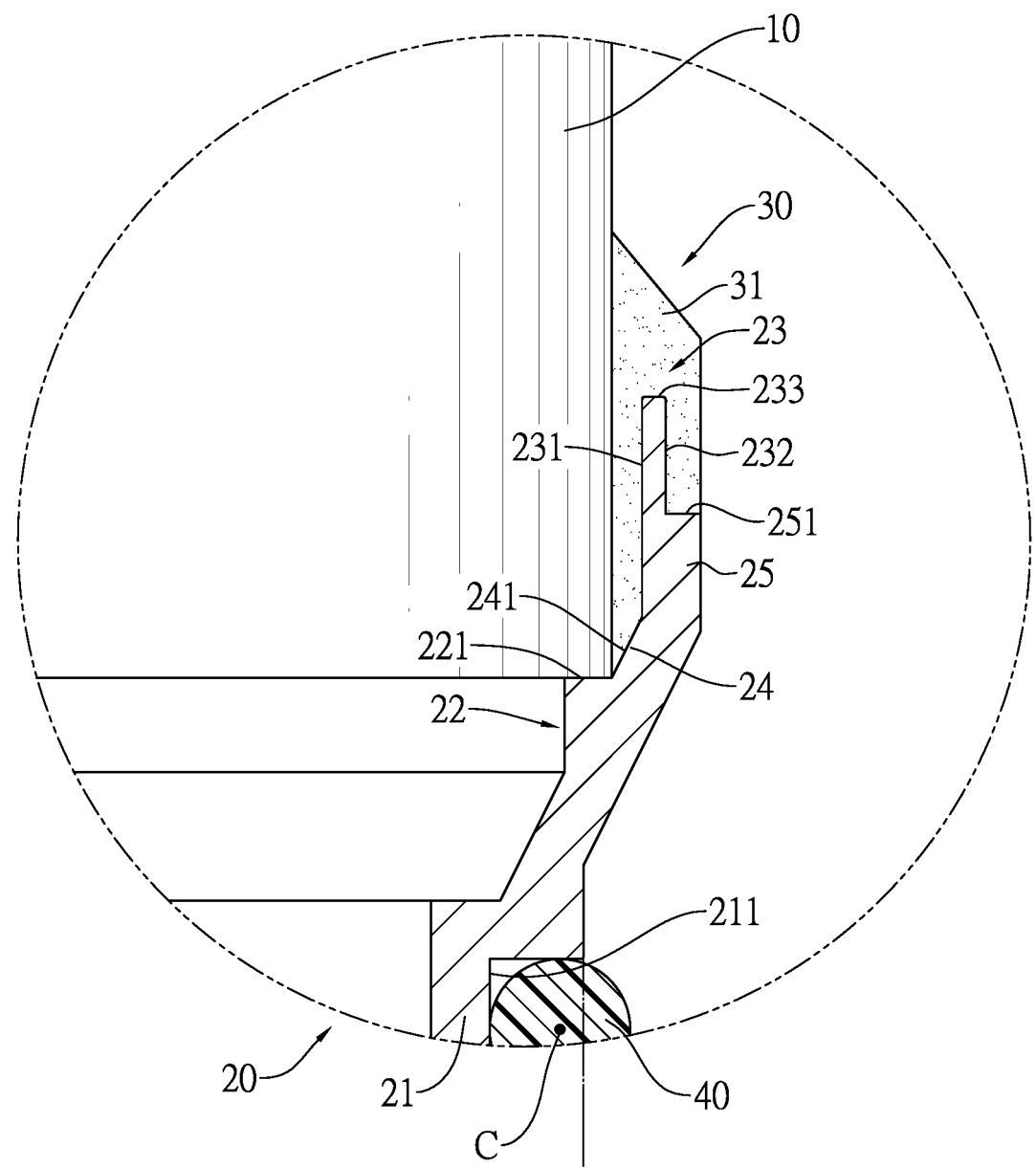
FIG. 7 is an enlarged view of FIG. 6.

With reference to FIGS. 1, 2, and 7, the filter frame 20 is mounted around an axial end of the filter core 10, and the shape of the filter frame 20 matches with the shape of the filter core 10. The filter frame 20 comprises a frame body 21, an abutting segment 22, a gluing segment 23, an inclined segment 24, an adhering segment 25, multiple strengthening boards 26 and multiple strengthening ribs 27.

The filter frame 20 is annular in shape. However, the term "annular" refers to any shape that is in a loop, and is not limited to a circle. That is, the filter frame can also be in any shape with a hollow center, for example, an obround shape.

The frame body 21 has two axial end openings, and the frame body 21 is disposed on one axial end of the filter core 10. The frame body 21 has two annular recesses 211 annularly formed in a radial outer surface of the frame body 21. The two annular recesses 211 are adjacent to one of the two axial end openings of the filter core 10, and said axial end opening is distal from the filter core 10.

The abutting segment 22 axially protrudes from and annularly extends along an edge of one of the two axial end openings of the frame body 21, and said axial end opening faces toward the filter core 10. The abutting segment 22 has a filter core abutting surface 221 formed on a surface of the abutting segment 22, and said surface is distal from the frame body 21. The filter core abutting surface 221 abuts against the axial end of the filter core 10.

The gluing segment 23 axially protrudes from and annularly extends along the filter core abutting surface 221 of the abutting segment 22, but the gluing segment 23 occupies only a part of the filter core abutting surface 221. To be specific, the gluing segment 23 is formed on a part of the filter core abutting surface 221 which is adjacent to a radial outer surface of the abutting segment 22. Therefore the filter core abutting surface 221 is still capable of abutting against the filter core 10. The gluing segment 23 surrounds the filter core 10.

The gluing segment 23 has an inner gluing surface 231, an outer gluing surface 232, and a top gluing surface 233. The inner gluing surface 231 and the outer gluing surface 232 are respectively formed on a radial inner side of the gluing segment 23 and a radial outer side of the gluing segment 23. The top gluing surface 233 is formed on an end of the gluing segment 23, and said end is distal from the abutting segment 22. The top gluing surface 233 connects between the inner gluing surface 231 and the outer gluing surface 232. In a preferred embodiment, the inner gluing surface 231 and the outer gluing surface 232 are parallel to each other. Also, the inner gluing surface 231 and the outer gluing surface 232 are both perpendicular to the top gluing surface 233. But the relative angular position between the inner gluing surface 231 and the outer gluing surface 232 are not limited thereto.

Figure 8:
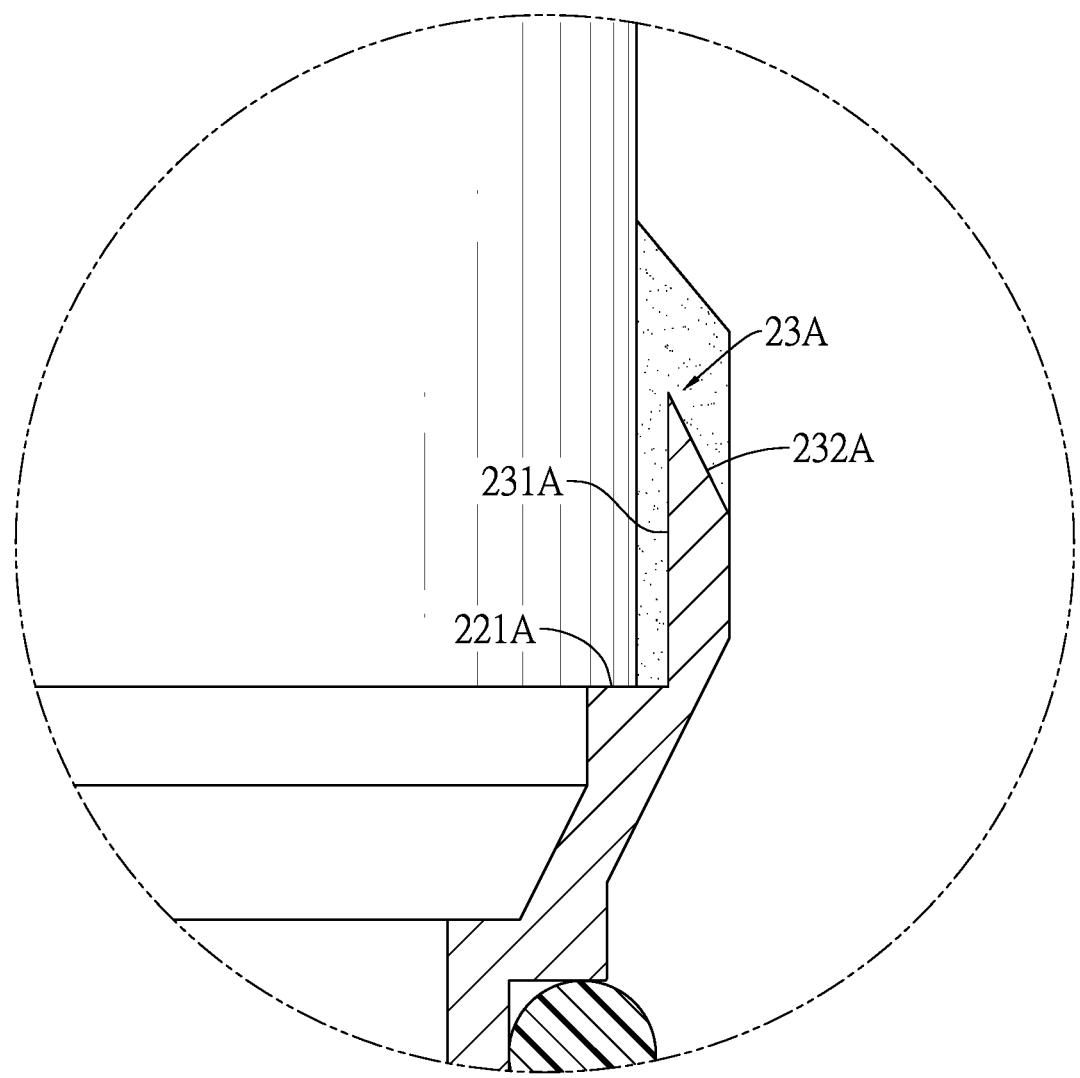
FIG. 8 is a cross sectional and enlarged view of a filter cartridge in another preferred embodiment in accordance with the present invention.

Moreover, in another preferred embodiment as shown in FIG. 8, the gluing segment 23A may be implemented without the top gluing surface. Instead, a top of the inner gluing surface 231A and a top of the outer gluing surface 232A are directly connected to each other.

With reference to FIGS. 2 and 7, the inclined segment 24 annularly extends along a boundary between the abutting segment 22 and the gluing segment 23. The inclined segment 24 has an inclined gluing surface 241 formed on the inclined segment 24. The inclined gluing surface 241 is obliquely connected between the filter core abutting surface 221 and the inner gluing surface 231.

Moreover, in another preferred embodiment as shown in FIG. 8, the gluing segment 23A may be implemented without the inclined segment. Instead, the inner gluing surface 231A and the filter core abutting surface 221 are directly connected to each other.

With reference to FIGS. 2 and 7, the adhering segment 25 radially protrudes from and annularly extends along the radial outer side of the gluing segment 23. The adhering segment 25 has a bottom gluing surface 251 formed on an end of the adhering segment 25, and said end is distal from the abutting segment 22. The bottom gluing surface 251 is connected to the outer gluing surface 232. In a preferred embodiment, the bottom gluing surface 251 is perpendicularly connected to the outer gluing surface 232, but it is not limited thereto, as the relative angle between the bottom gluing surface 251 and the outer gluing surface 232 may be adjusted according to the needs of the user. Besides, in another preferred embodiment, with reference to FIG. 8, the gluing segment 23A may have no adhering segment.

Figure 3:
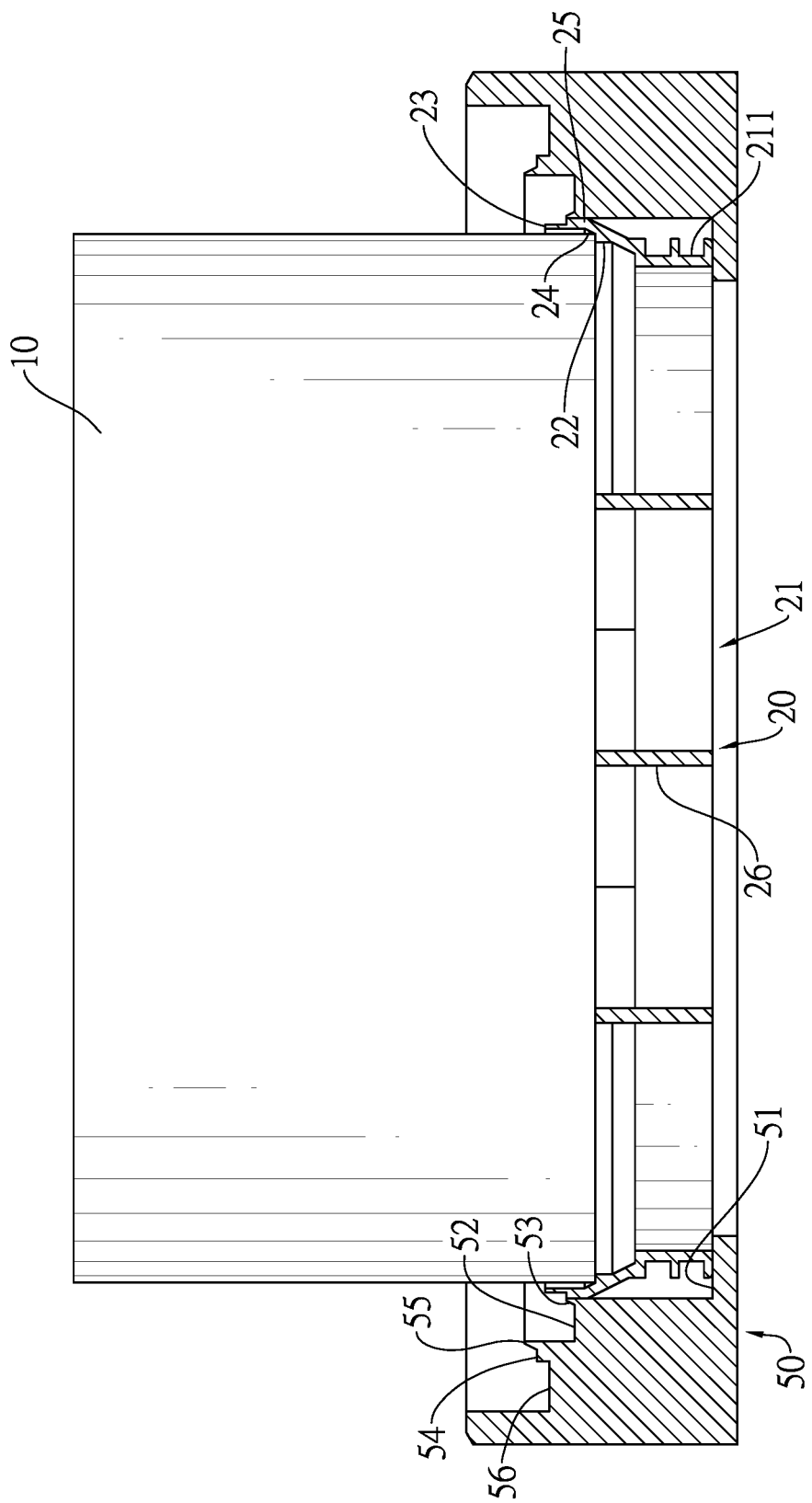
FIGS. 3 to 6 are operational views of the gluing method of the filter cartridge in accordance with the present invention.

With reference to FIGS. 2 and 3, two transverse ends of each strengthening board 26 are radially and respectively connected to two inner surfaces of the frame body 21, and said two inner surfaces are opposite to each other. A top side (an axial side) of each strengthening board 26 extends to be aligned with the filter core abutting surface 221 of the abutting segment 22. A bottom side (another axial side) of each strengthening board 26 extends to be aligned with a bottom side of the frame body 21 (which is an edge of an opening of the frame body 21 that is formed on an end of the filter frame 20 that is opposite to the abutting segment 22).

In a preferred embodiment, the strengthening boards 26 are arranged apart from each other, and one of the strengthening boards 26 passes through a center of the frame body 21.

The strengthening ribs 27 are mounted between the strengthening boards 26, and a top side (an axial side) of each strengthening rib 27 extends to be aligned with the filter core abutting surface 221 of the abutting segment 22.

In a preferred embodiment, the filter frame 20 is obround. The strengthening boards 26 are arranged parallel and apart from each other, and the strengthening ribs 27 are obliquely and crossly connected between the strengthening boards 26.

Figure 9:
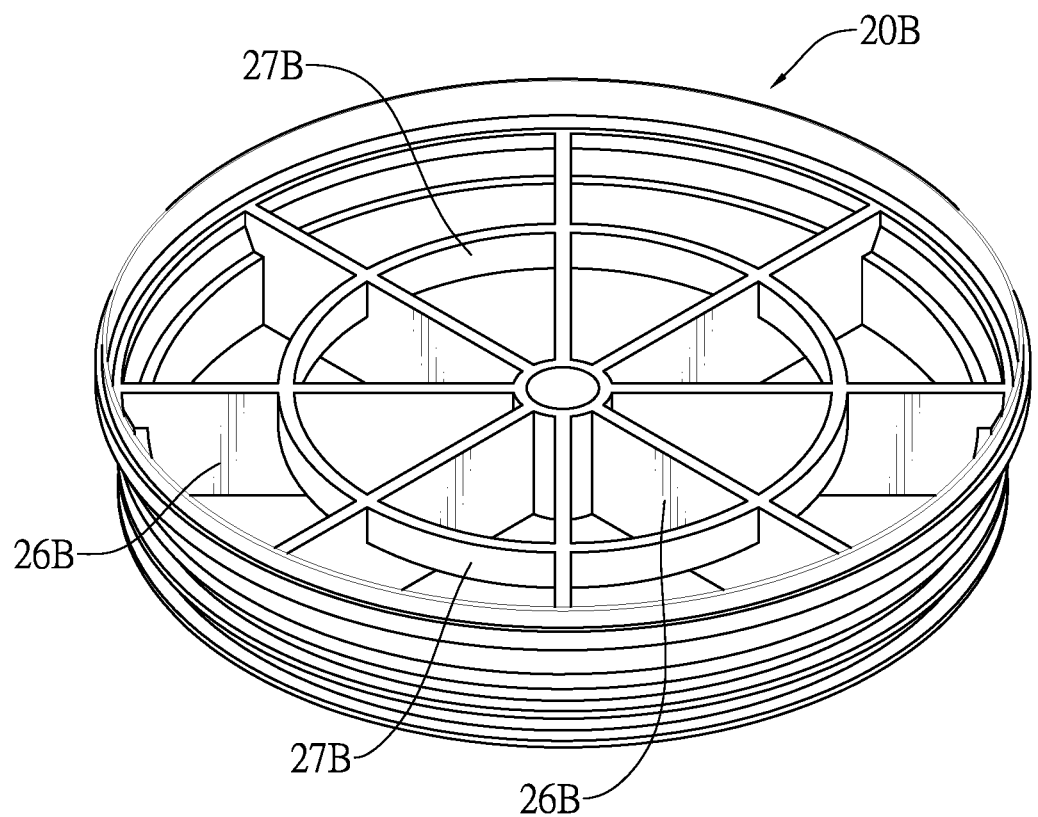
FIG. 9 is a perspective view of a filter frame in another preferred embodiment in accordance with the present invention.
Figure 10:
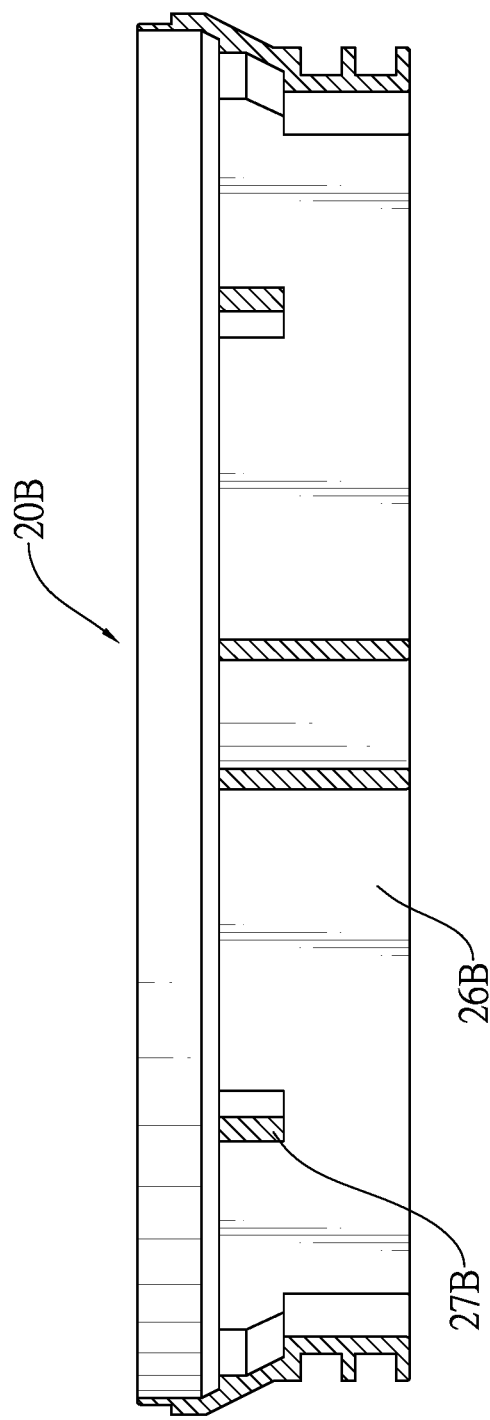
FIG. 10 is a cross-sectional side view of a filter frame in another preferred embodiment in accordance with the present invention.

In another preferred embodiment as shown in FIGS. 9 and 10, the shape of the filter frame 20B is circular. The strengthening ribs 27B are circularly arranged apart from each other and are mounted between the strengthening boards 26B.

With reference to FIGS. 1 and 7, the glue 30 is coated around the gluing segment 23 and extends into a position between the gluing segment 23 and the filter core 10. The glue 30 is attached to an outer surface of the filter core 10, the inclined gluing surface 241, the inner gluing surface 231, the top gluing surface 233, the outer gluing surface 232, and the bottom gluing surface 251. The filter frame 20 is adhered securely to the filter core 10 by the glue 30. In a preferred embodiment, the glue 30 may be formed by foaming in a mold with hot-melt adhesive or Polyurethane (PU).

With reference to FIGS. 1 to 3, and 7, the two sealing units 40 are mounted around the filter frame 20. In a preferred embodiment, the two sealing units 40 are each a respective resilient sealing ring, and the two resilient sealing rings are respectively mounted around the two annular recesses 211 of the frame body 21 of the filter frame 20. Besides, the two resilient sealing rings protrude out of the respective annular recesses 211, but the center of a cross section of each resilient sealing ring annularly forms a circular centerline C along said resilient sealing ring. The centerline C is disposed inside the corresponding annular recess 211 (as shown in FIG. 7).

In a preferred embodiment, the sealing unit (which is a resilient sealing ring) is made of, but not limited to, foam rubber, Chloroprene rubber (CR rubber), ethylene propylene diene monomer (M-class) rubber (EPDM rubber) or Polyurethane (PU).

Figure 11:
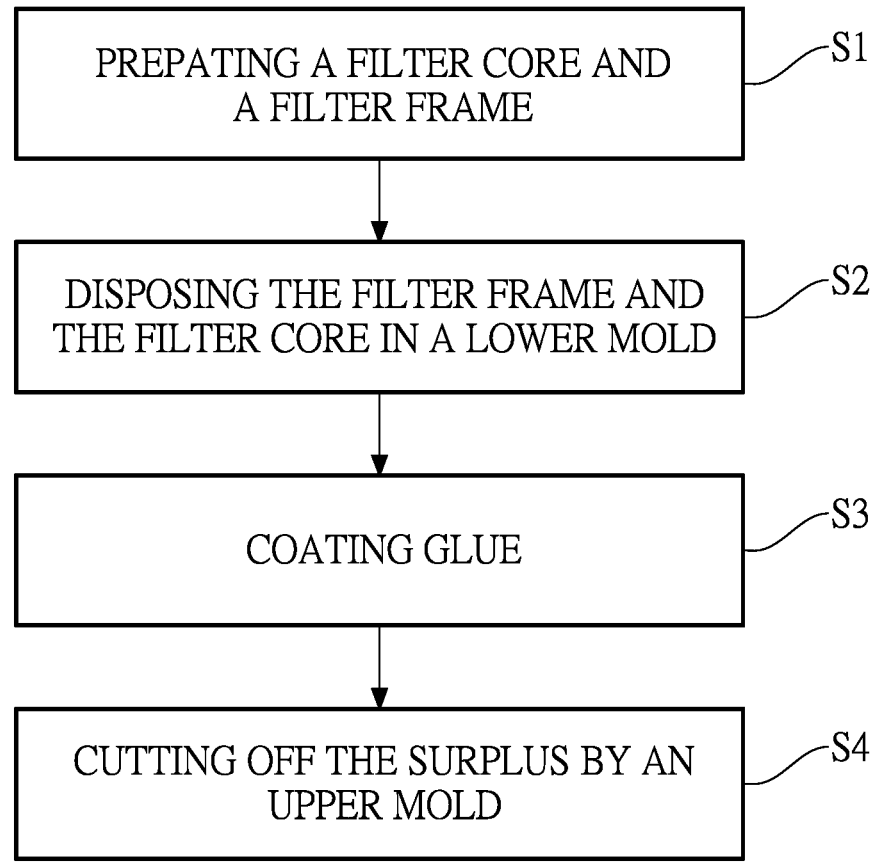
FIG. 11 is a block diagram of a gluing method for a filter cartridge in accordance with the present invention.
Figure 12:
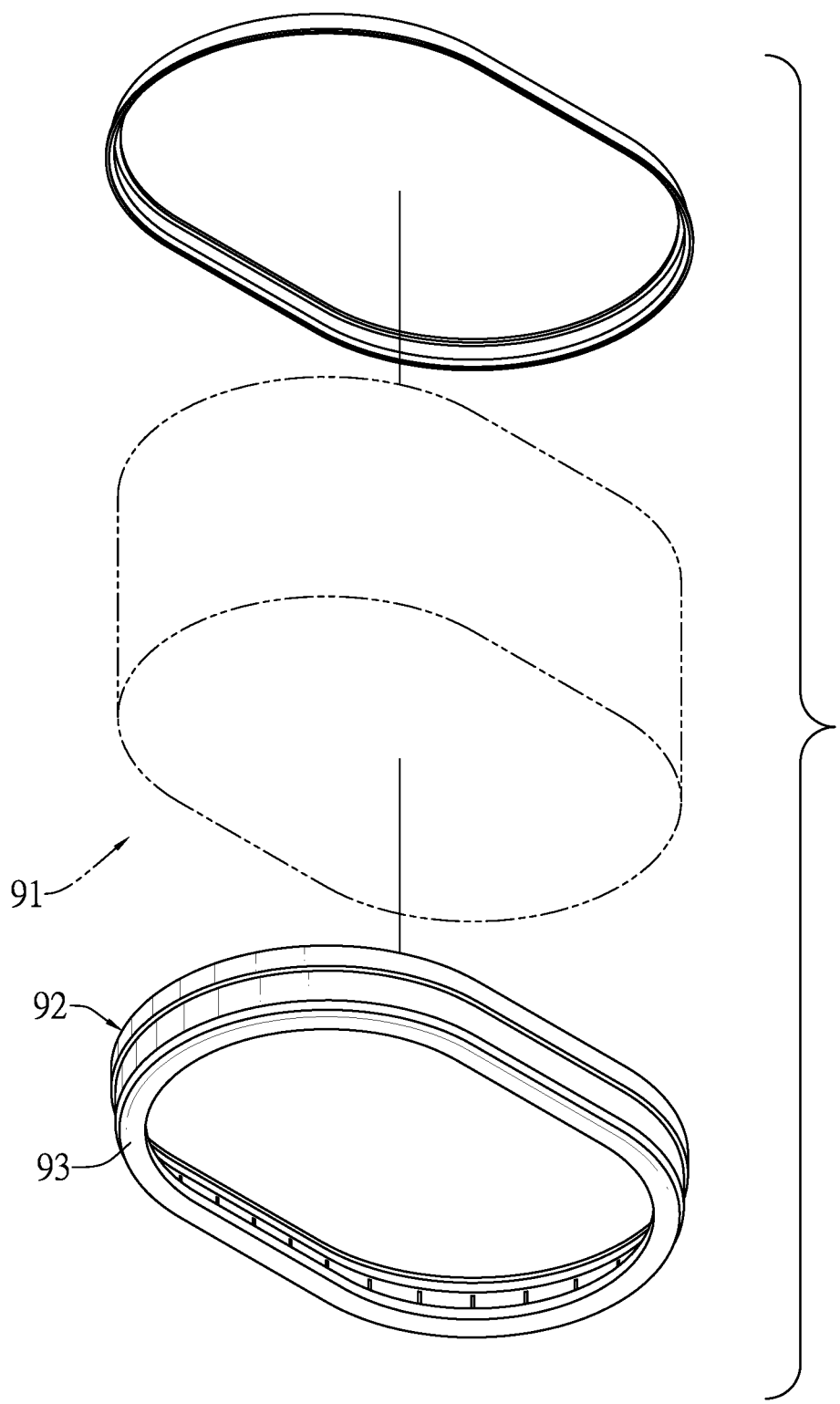
FIG. 12 is an exploded perspective view of a filter cartridge in accordance with the conventional filter cartridge.
Figure 13:
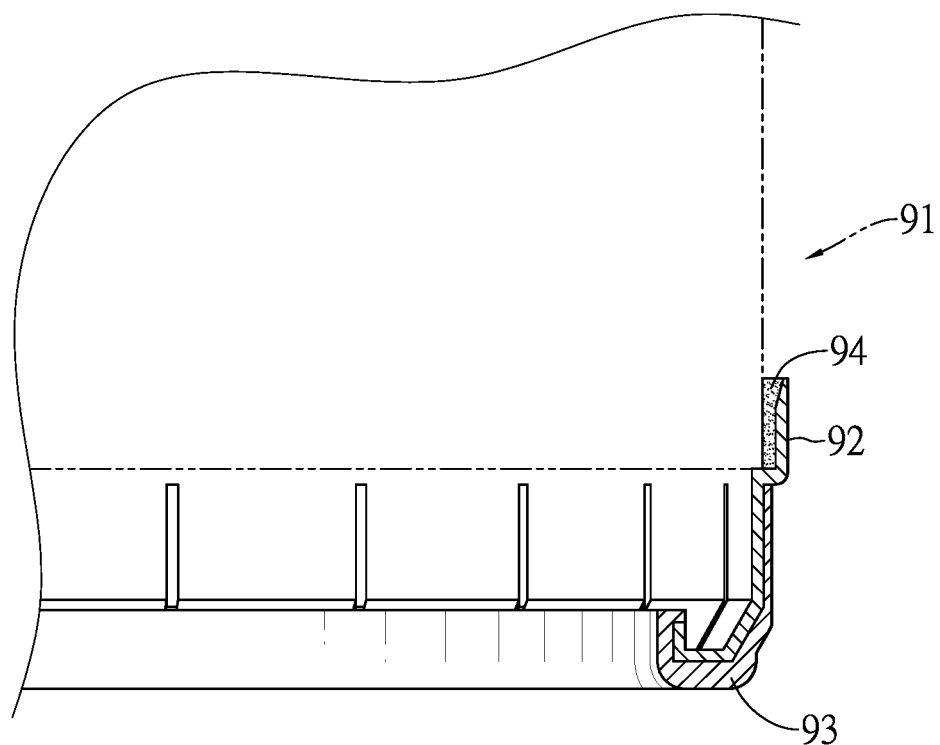
FIG. 13 is an enlarged and cross sectional side view of a filter cartridge in accordance with the conventional filter cartridge.
Figure 14:
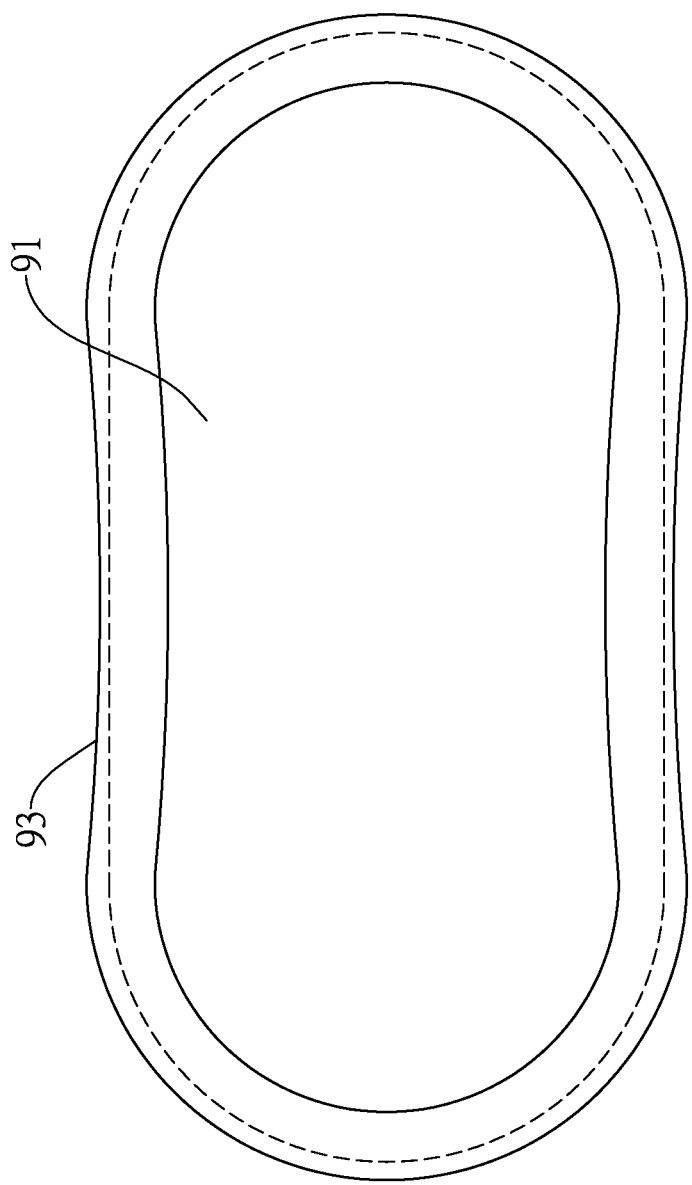
FIG. 14 is a schematic view of a conventional filter cartridge deformed into a peanut-shape.

With reference to FIG. 11, the gluing method of the filter cartridge in accordance with the present invention comprises the following steps.

The first step (S1) is to prepare materials. With reference to FIGS. 2 and 7, a filter core 10 and a filter frame 20 are prepared. The filter frame 20 comprises an axial direction, a radial direction, a frame body 21, an abutting segment 22, and a gluing segment 23. The axial direction and the radial direction are perpendicular to each other. The frame body 21 is annular and has two axial end openings formed on two axially opposite ends of the frame body 21. The abutting segment 22 axially protrudes from and annularly extends along an edge of one of the two axial end openings of the frame body 21.

The abutting segment 22 has a filter core abutting surface 221 formed on a surface of the abutting segment 22, and said surface is distal from the frame body 21. The gluing segment 23 axially protrudes from and annularly extends along the filter core abutting surface 221 of the abutting segment 22. The gluing segment 23 has an inner gluing surface 231 and an outer gluing surface 232 formed respectively on a radial inner side and a radial outer side of the gluing segment 23.

In a preferred embodiment, the structure of the filter core 10 and the filter frame 20 is identical to that of the aforementioned filter core 10 and filter frame 20, and thus the detailed structures of the filter core 10 and the filter frame 20 are not repeated.

The second step (S2) is to dispose the filter frame 20 and the filter core 10 in a lower mold 50. With reference to FIGS. 3 and 7, the filter frame 20 and the filter core 10 are disposed in a lower mold 50. The lower mold 50 has an accommodating recess 51, a glue melting recess 52, a cutting segment 53, an overflow recess 54, an annular wall 55, and a locating recess 56 all formed on a top surface of the lower mold 50.

The accommodating recess 51 is formed in a center of the lower mold 50. The accommodating recess 51 corresponds in shape to the filter frame 20. The glue melting recess 52 annularly extends and is disposed radially outward with respect to the accommodating recess 51. The cutting segment 53 is formed on and annularly extends along a boundary between the accommodating recess 51 and the glue melting recess 52. The cutting segment 53 is an annular inclined surface. The overflow recess 54 is annularly formed on a radial outer side of the glue melting recess 52. The annular wall 55 protrudes from and annularly extends from a position between the overflow recess 54 and the glue melting recess 52. The locating recess 56 is annularly formed on a radial outer side of the overflow recess 54, and the locating recess 56 communicates with the overflow recess 54.

Put the filter frame 20 and the filter core 10 into the accommodating recess 51 of the lower mold 50 in a position such that the filter frame 20 faces down and the filter core 10 faces up. At this time, the cutting segment 53 of the lower mold 50 will then surround and attach to the radial outer side of the filter frame 20, i.e. a radial outer surface of the adhering segment 25 of the filter frame 20 to which the cutting segment 53 is attached. A bottom end (an axial end) of the filter core 10 is mounted through the gluing segment 23 and attaches downward to the filter core abutting surface 221 of the filter frame 20.

Figure 4:
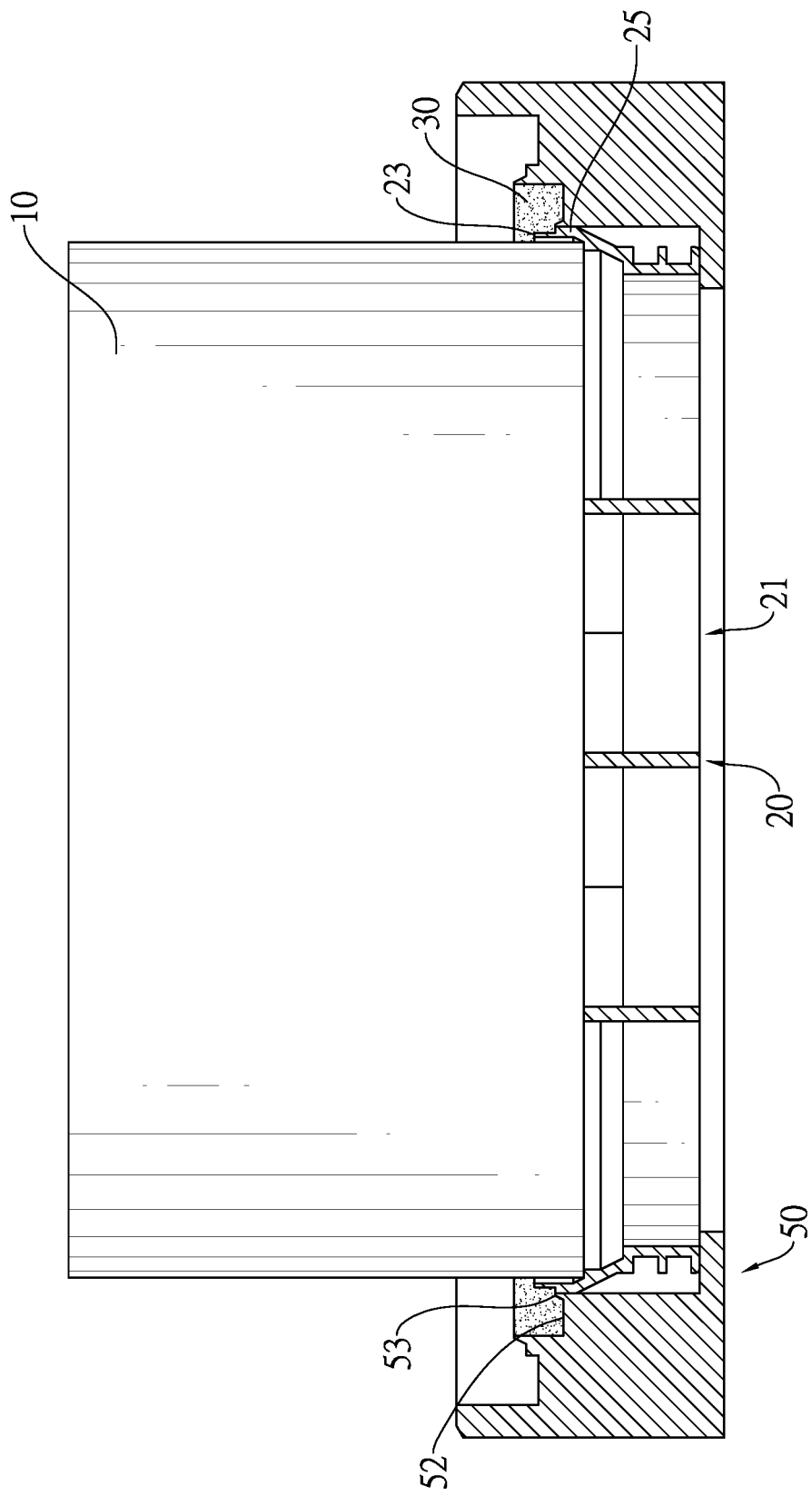

The third step (S3) is to coat glue. With reference to FIGS. 4 and 7, the glue 30 is coated on the filter core 10 and the gluing segment 23 of the filter frame 20. To be specific, the glue 30 attaches to a top end of the gluing segment 23 (the top gluing surface 233), the outer gluing surface 232, the bottom gluing surface 251, and the outer surface of the filter core 10.

In a preferred embodiment, the glue 30 fills up the glue melting recess 52 of the lower mold 50, and the glue 30 will cover the cutting segment 53 and attaches to the radial outer side of the filter frame 20 (the gluing segment 23 and the adhering segment 25) and the outer surface of the filter core 10.

In a preferred embodiment, it is not a prerequisite to coat the glue 30 deeply into a position between the gluing segment 23 and the filter core 10 in advance, as the glue 30 may be slightly coated between the gluing segment 23 and the filter core 10, or be coated deeply between the gluing segment 23 and the filter core 10.

Figure 5:
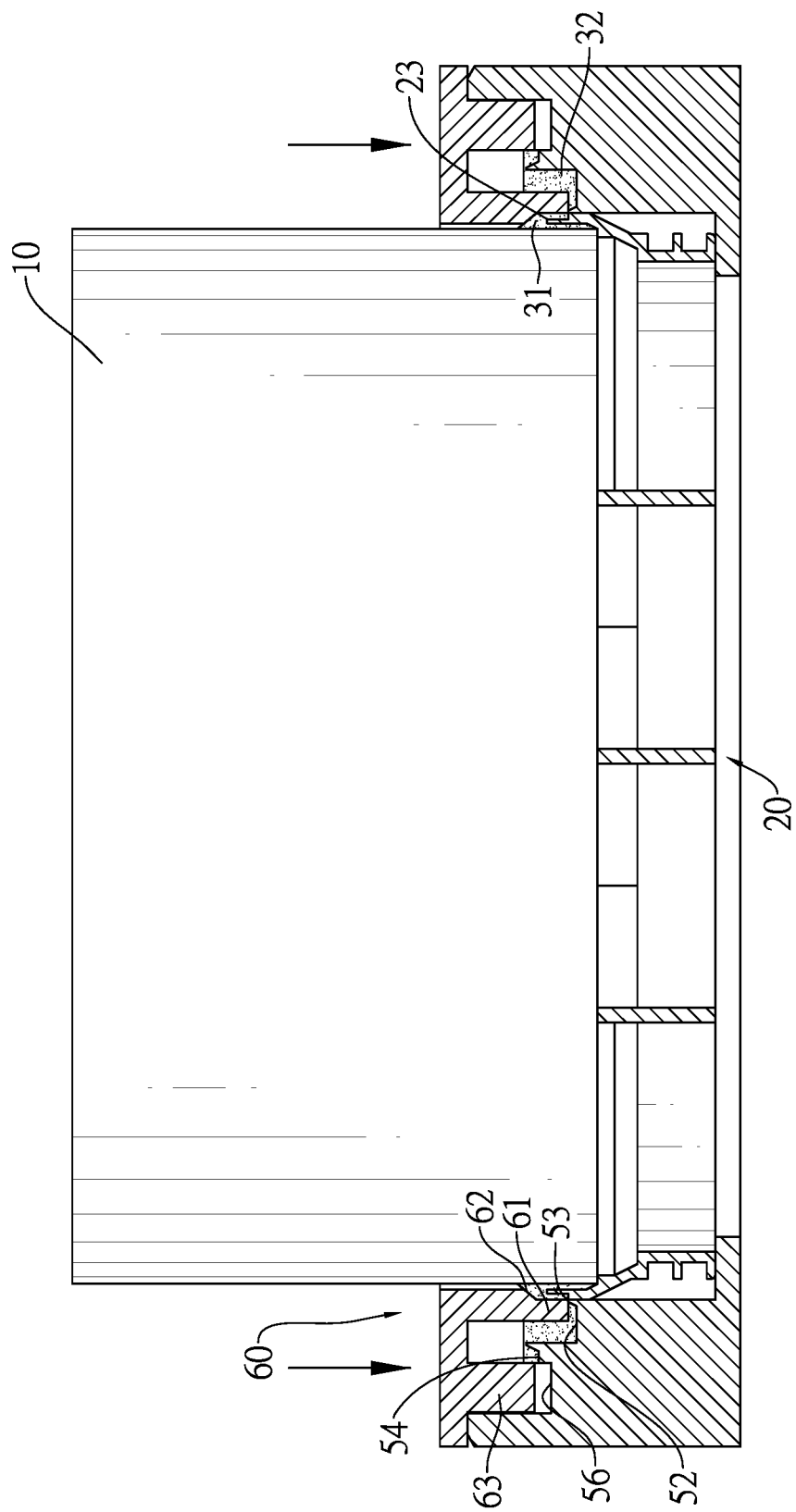

The fourth step (S4) is to cut off the surplus glue by an upper mold. With reference to FIGS. 5 and 7, an upper mold 60 is pressed downward and towards the lower mold 50 and the filter frame 20. In a preferred embodiment, the upper mold 60 is made of thermally conductive materials and further comprises a pressing segment 61, an inclined pushing surface 62, and a locating segment 63.

The pressing segment 61 protrudes downward on a bottom surface of the upper mold 60 and extends annularly. The pressing segment 61 corresponds in position to the cutting segment 53 of the lower mold 50. A bottom surface of the pressing segment 61 is a flat surface. The term "flat surface" as mentioned above does not necessarily imply a completely smooth surface but the surface may have bumps and holes on the surface. Moreover, the meaning of the "flat surface" is to indicate that the way the pressing segment 61 presses the glue 30 is by the compression from the bottom surface of the pressing segment 61 toward the glue 30, which is different from the way the cutting segment 53 cuts the glue 30. To be specific, the cutting segment 53 cuts the glue by the inclined surface on it.

The inclined pushing surface 62 is formed annularly on a radial inner side of the pressing segment 61. The locating segment 63 protrudes downward from the bottom surface of the upper mold 60, extends annularly, and is on a radial outer side of the pressing segment 61. The locating segment 63 corresponds in position to the locating recess 56 of the lower mold 50. When the upper mold 60 is pressed downward, the locating segment 63 of the upper mold 60 and the locating recess 56 of the lower mold 50 jointly ensure the attachment between the upper mold 60 and the lower mold 50 is precise and accurate.

The upper mold 60 presses the glue 30 and cut the glue 30 into an inner glue segment 31 and an outer glue segment 32. In a preferred embodiment, the bottom surface (flat surface) of the pressing segment 61 of the upper mold 60 abuts against the cutting segment 53, and the glue 30 is cut by the cutting segment 53 into the inner glue segment 31 and the outer glue segment 32, wherein the inner glue segment 31 is disposed on the radial inner side of the pressing segment 61, the outer glue segment 32 is disposed on the radial outer side of the pressing segment 61, but it is not limited thereto. The lower mold 50 may be implemented without the cutting segment 53 and the bottom surface of the pressing segment 61 of the upper mold is an inclined surface instead, so the cutting function can still be achieved.

After the glue 30 is cut into the inner glue segment 31 and the outer glue segment 32, the inner glue segment 31 is attached to the filter frame 20 and the filter core 10 to securely adhere the filter frame 20 to the filter core 10. Meanwhile, the upper mold 60 also presses a portion of the inner glue segment 31 between the gluing segment 23 and the filter core 10, by which said portion of the inner glue segment 31 is attached to the inner gluing surface 231, the inclined gluing surface 241, and the outer surface of the filter core 10. Therefore the inner glue segment 31 is coated around the gluing segment 23.

Moreover, when pressing the upper mold 60 downward, the inclined pushing surface 62, which is on the radial inner side of the pressing segment 61, will also press a portion of the inner glue segment 31 toward the filter core 10, which forces said portion of the inner glue segment 31 to extend upward along the inclined pushing surface 62 and the outer surface of the filter core 10. By doing so, it increases the adhering area between the inner glue segment 31 and the outer surface of the filter core 10. The outer glue segment 32 is disposed in the glue melting recess 52 and pressed by the pressing segment 61 of the upper mold 60 and therefore overflows into the overflow recess 54.

Furthermore, the timing of cutting the glue is crucial because the viscidity of the glue 30 will increase and the fluidity of the glue will decrease along with the cooling of the glue 30. Besides, it is also harder to cut the glue 30 when it is cooled. However, if the temperature of the glue 30 is too high, demolding will become difficult.

By filling a great amount of glue 30 in the glue melting recess 52 of the lower mold 50, the present invention prevents the glue 30 from cooling down too soon, which ensures that when the upper mold 60 presses downward, the glue 30 can keep its temperature to a certain degree so the fluidity is still high and the glue is still easy to cut.

Meanwhile, because the upper mold 60 is made of thermally conductive materials, when the pressing segment 61 of the upper mold 60 attaches to the glue 30, the upper mold 60, by its thermal conductivity, lowers the temperature of a portion of the glue 30 that contacts the upper mold 60. Therefore the portion of the glue 30 can be cooled rapidly and solidified. The solidified glue 30 may be easily separated from the upper mold 60, specifically, from the pressing segment 61.

By the design of the glue melting recess 52 of the lower mold 50 and the thermal conductivity of the upper mold 60, the glue 30 may maintain high temperature and high fluidity, but also may be easily separated from the mold after cutting.

Figure 6:
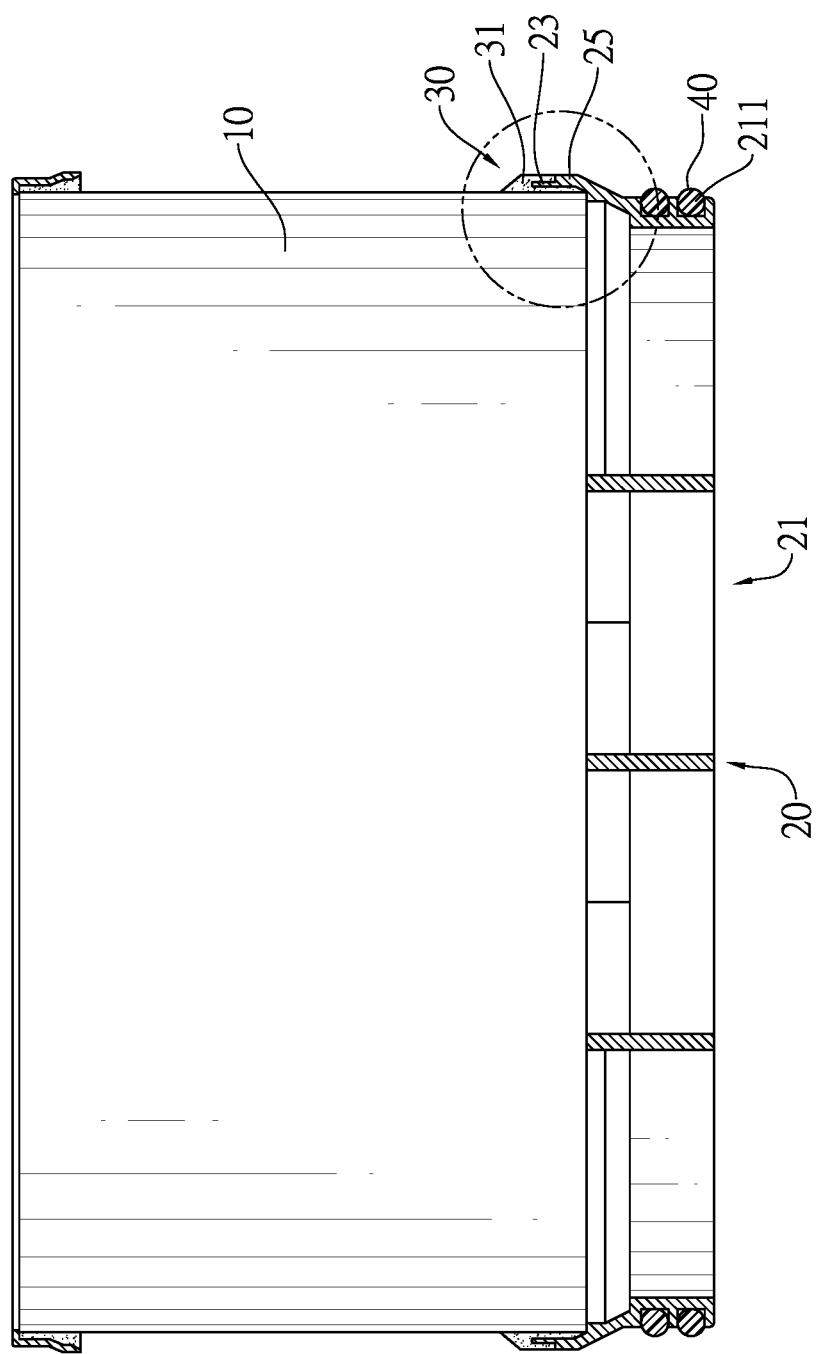

With reference to FIG. 6, lastly, take out the filter frame 20, the filter core 10 and the inner glue segment 31 from the upper mold 60 and the lower mold 50.

The present invention does not require the user to coat the glue 30 into a position deeply between the filter core 10 and the gluing segment 23 beforehand. In contrast, the user may roughly coat the glue 30 around, and then cut off the surplus glue 30 (outer glue segment 32) by pressing the upper mold 60 downward. By doing so, the glue 30 (the inner glue segment 31) is conveniently formed into the desired shape. Besides, the surplus glue 30 (the outer glue segment 32) on the lower mold 50 may be reused, and therefore the present invention may also reduce the glue consumption, which is environmentally friendly.

The present invention can also dramatically increase the adhering area between the glue 30 and the filter frame 20 by coating the glue 30 around the gluing segment 23 of the filter frame 20, especially by coating the glue 30 around the top side of the gluing segment 23 (the top gluing surface 233), the radial inner side of the gluing segment 23 (the inner gluing surface 231) and the radial outer side of the gluing segment 23 (the outer gluing surface 232) by the glue 30. Besides, the glue 30 also extends to the inclined gluing surface 241 and the bottom gluing surface 251, which are respectively formed on the radial inner side and the radial outer side of the gluing segment 23.

Furthermore, because the present invention has a great amount of glue 30 coated on the gluing segment 23 and the filter core 10 beforehand, when the upper mold 60 is pressed downward and toward the lower mold 50 and the filter frame 20, a portion of the glue 30 that is disposed on the inner side of the upper mold 60 (the inner glue segment 31) will be pressed upward. Thus, said portion of the glue 30 may greatly attach to the outer surface of the filter core 10, and therefore the adhering area between the glue 30 and the filter core 10 may be increased. The inclined pushing surface 62 of the upper mold 60 may further increase the height of the glue 30 (the inner glue segment 31) to increase the adhering area with the filter core 10.

Moreover, the inclined pushing surface 62 of the upper mold 60 not only can increase the height of the inner glue segment 31, but also can force the inner glue segment 31 to form an annular inclined surface. Therefore, it may further reduce the consumption of the glue 30 but still maintain a large adhering area (with the filter core 10).

The present invention enhances the sealing and adhering effect by increasing the adhering area between the glue 30 and the filter frame and the filter core 10.

Meanwhile, the pressure caused by the pressing down of the upper mold 60 will not only press the glue 30 deeply into the gap between the filter core 10 and the gluing segment 23 to increase the adhering area, but also forces the glue 30 to be tightly adhered to the gluing segment 23 and the filter core 10 to further enhance the adhering effect. By doing so, the present invention is capable of achieving a fast and reliable way of sealing and adhering the filter cartridge.

Lastly, the height of the glue 30 is higher than the height of the gluing segment 23 because the glue 30 (specifically, the inner glue segment 31) is coated around the gluing segment 23. In other words, the height of the gluing segment 23 can be designed lower, and therefore the total volume (height) of the filter frame 20 may be reduced.

Furthermore, in another preferred embodiment, the lower mold 50 may be implemented without the glue melting recess 52. Instead, the glue 30 may be roughly coated on the top end of the gluing segment 23 of the filter frame 20, the outer gluing surface 232, and the outer surface of the filter core 10. Therefore the glue 30 will slightly overflow to the top surface of the lower mold 50 during the manufacturing process. The user may cut off the surplus glue 30 in the end of the process as usual and the multiple advantages as shown above are still maintained.

Besides, by forming the annular recess 211 in the frame body 21 of the filter frame 20 and mounting the sealing unit 40, which is a resilient sealing ring, in the annular recess 211, the resilient sealing ring abuts against an inner surface of the housing of the filter device to seal the filter device radially. Therefore, the resilient sealing ring is reusable, which is environmentally friendly and also easily replaceable. Moreover, the resilient sealing ring may be modularly designed, which means the materials of the resilient sealing ring may be adjusted according to the varying environments—e.g. high temperature resistant, oil resistant, polar climate resistant, etc. Additionally, the cost for making the resilient sealing ring is low, which may dramatically lower the overall cost of the filter cartridge.

Moreover, the materials of the resilient sealing ring are also low in hardness (e.g. the foam rubber), and therefore the resilient sealing ring may be mounted into the housing of the filter device easily in a labor-saving manner. Even if the user increases the compression range by increasing an outer diameter of the resilient sealing ring, it still takes less effort to mount the resilient sealing ring into the housing of the filter device.

On the other hand, the compression level of the resilient sealing ring has a positive correlation with the tolerance of the resilient sealing ring. Also, even if the race-track-shaped filter core 10 and the filter frame 20 have deformed into the peanut-shaped structure, the resilient sealing ring may still abut against the inner surface of the housing to prevent the leakage of the fluid passing through the filter device. Moreover, the usage of the softer material on the resilient sealing ring may also reduce the sealing pressure. To be specific, the reactionary force of the resilient sealing ring is reduced to avoid the deformation of the filter core 10 and the filter frame 20.

Lastly, the strengthening boards 26 and the strengthening ribs 27 of the filter frame 20 may effectively avoid the deformation of the filter cartridge, especially by the extension of the top side (the axial side) of each one of the strengthening boards 26 toward to a position aligned with the filter core abutting surface 221 of the abutting segment 22 and by extension of the bottom side (another axial side) of each one of the strengthening boards 26 toward the bottom side of the frame body 21. In other words, because each one of the strengthening boards 26 has a certain height and some of the strengthening boards 26 pass through the center of the filter frame 20, the structure of the strengthening boards 26 may sufficiently avoid the deformation of the frame body 21 and the filter frame 20.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A gluing method of a filter cartridge comprising steps as follows:
   (a) preparing a filter core and a filter frame, wherein the filter frame comprises an axial direction, a radial direction, a frame body, an abutting segment and a gluing segment; the radial direction is perpendicular to the axial direction; the frame body is annular and has two axial end openings being opposite to each other; the abutting segment axially protrudes from and annularly extends along an edge of one of the two axial end openings; the abutting segment has a filter core abutting surface formed on a surface of the abutting segment and said surface is distal from the frame body; the gluing segment axially protrudes from and annularly extends around the filter core abutting surface of the abutting segment; the gluing segment has an inner gluing surface and an outer gluing surface respectively formed on a radial inner side and a radial outer side of the gluing segment;
   (b) disposing the filter frame and the filter core in a lower mold, wherein the filter frame is disposed below the filter core; one axial end of the filter core is mounted through the gluing segment and attaches to the filter core abutting surface of the filter frame;
   (c) coating glue, wherein the glue is coated on the gluing segment of the filter frame and the filter core, and the glue is attached to an upper end of the gluing segment, the outer gluing surface, and an outer surface of the filter core;
   (d) cutting off the surplus glue by an upper mold, wherein the upper mold is pressed downward and toward the lower mold and the filter frame to cut the glue into an inner glue segment and an outer glue segment; the inner glue segment is attached to the filter frame and the filter core to adhere the filter frame securely to the filter core; the upper mold also presses the inner glue segment into a position between the upper gluing segment and the filter core to attach the inner glue segment to the inner gluing surface of the gluing segment and to coat the inner glue segment around the gluing segment; lastly, the filter frame, the filter core, and the inner glue segment are taken out from the upper mold and the lower mold.

2. The gluing method of a filter cartridge as claimed in claim 1, wherein
   the lower mold has a glue melting recess annularly formed in a top of the lower mold, and the glue melting recess surrounds a radial outer side of the filter frame;
   in step (c), the glue is coated on the gluing segment of the filter frame and is filled in the glue melting recess simultaneously;
   in step (d), the outer glue segment, which is formed by cutting the glue, is disposed in the glue melting recess.

3. The gluing method of a filter cartridge as claimed in claim 2, wherein:
   the lower mold has
      an overflow recess annularly formed in the top of the lower mold and disposed radially outward with respect to the glue melting recess;
      an annular wall mounted between the glue melting recess and the overflow recess;
   in step (c), the glue is coated on the gluing segment of the filter frame and fills up the glue melting recess simultaneously;
   in step (d), a portion of the glue that is disposed on a radial outer side of the upper mold flows into the overflow recess by pressing of the upper mold.

4. The gluing method of a filter cartridge as claimed in claim 1, wherein:
   the lower mold has a cutting segment annularly formed on the lower mold, annularly attaching to a radial outer surface of the filter frame, and being an annular inclined surface;
   the upper mold has a pressing segment annularly formed on and downward protruding from the upper mold; wherein the pressing segment corresponds in position to the cutting segment, and a bottom surface of the pressing segment is a flat surface;
   in step (c), the glue is coated on the gluing segment of the filter frame and extends on the cutting segment;
   in step (d), the upper mold is pressed downward and toward the lower mold to press the lower mold downward until the bottom surface of the pressing segment abuts against the cutting segment, and the glue is cut and separated into the inner glue segment and the outer glue segment by the cutting segment.

5. The gluing method of a filter cartridge as claimed in claim 4, wherein:

the upper mold has an inclined pushing surface annularly formed on a radial inner side of the pressing segment of the upper mold;

in step (d), the upper mold is pressed downward and toward the lower mold to cut the glue, a portion of the glue that is disposed on a radial inner side of the upper mold is pressed toward the filter core by the inclined pushing surface of the upper mold, and said portion of the glue then protrudes upward along the inclined pushing surface and the outer surface of the filter core.

6. The gluing method of a filter cartridge as claimed in claim 1, wherein:

the upper mold is made of thermally conductive materials;

in step (d), the upper mold is pressed downward and toward the lower mold, and when the upper mold contacts the glue, a portion of the glue that contacts the upper mold is cooled and solidified by the upper mold.

* * * * *